United States Patent [19]
Rainville

[11] 3,832,101
[45] Aug. 27, 1974

[54] MOLDULAR CONSTRUCTION MULTI-STATION MOLDING APPARATUS

[75] Inventor: Dewey Rainville, Westfield, N.J.

[73] Assignee: Rainville Company, Inc., Middlesex, N.J.

[22] Filed: June 4, 1973

[21] Appl. No.: 366,321

[52] U.S. Cl................ 425/242 B, 425/DIG. 232, 425/DIG. 209
[51] Int. Cl............................................ B29d 23/03
[58] Field of Search....... 425/242, 242 B, DIG. 232, 425/DIG. 209, 246, 249, 326, 326 B, 387

[56] References Cited
UNITED STATES PATENTS

| | | | |
|---|---|---|---|
| 3,690,799 | 9/1972 | Johnson | 425/249 X |
| 3,694,124 | 9/1972 | Saumsiegle et al. | 425/242 B |
| 3,694,126 | 9/1972 | Pechthold | 425/326 B |
| 3,778,210 | 12/1973 | Heath, Jr. et al. | 425/326 B X |

Primary Examiner—Frank T. Yost
Attorney, Agent, or Firm—Sandoe, Hopgood & Calimafde

[57] ABSTRACT

This invention is a multi-station molding machine of modular construction. Sections of a machine, such as an injection station; a pre-blow station; a full flow station; and a stripper station are made as individual performance units that can be assembled in different relations with respect to a central indexing unit and to each other. The individual performance units are shaped so that they can be fitted together in different ways to make complete molding machines from the standardized unit sections assembled in different ways according to the sequence of operations that are to be carried out for making a particular article. When the sections comprising the performance units are joined by detachable fastening means to a connector plate, they can be re-arranged as desired to change their machine from a three-step to a four or five step machine according to changes in the number of operations required for the article that is to be produced.

15 Claims, 11 Drawing Figures

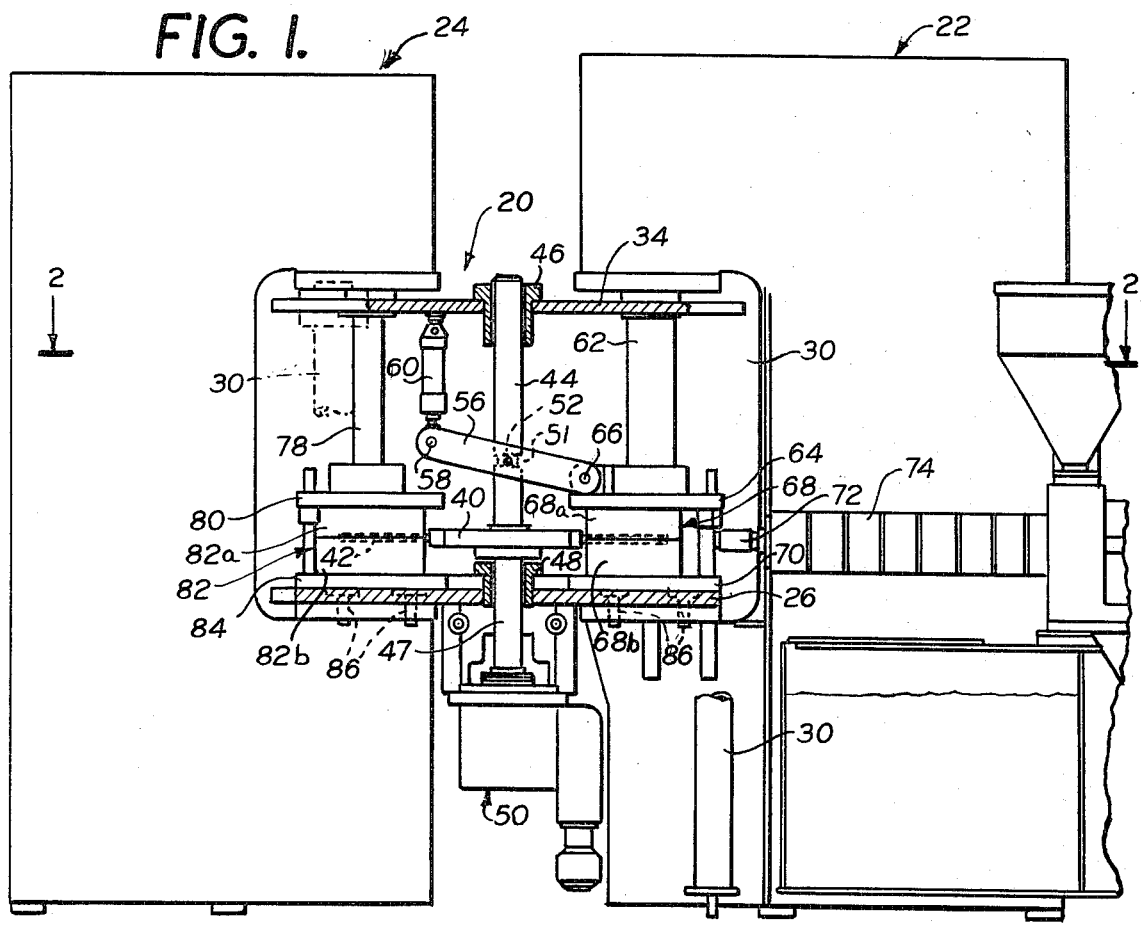
FIG. I.
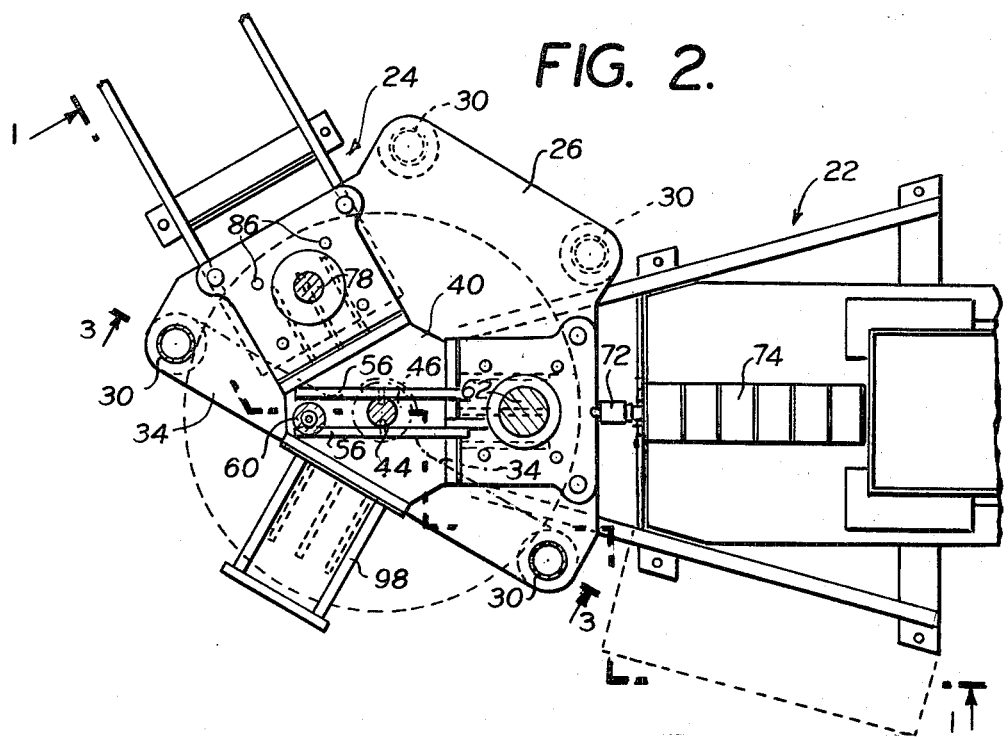
FIG. 2.

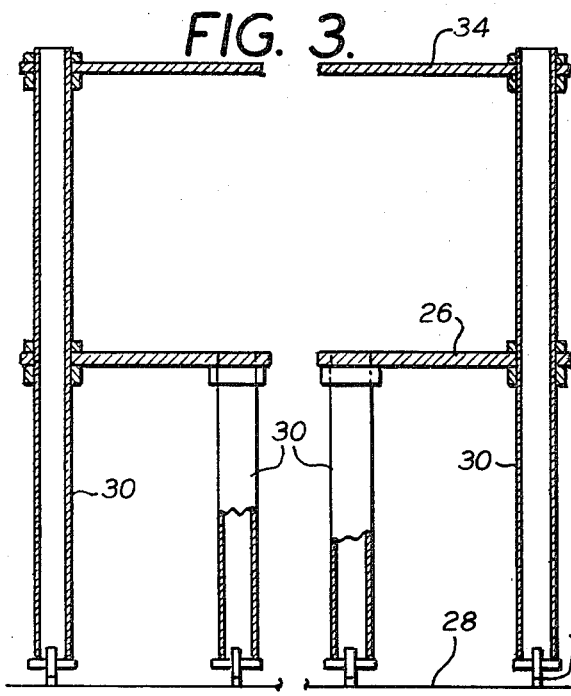
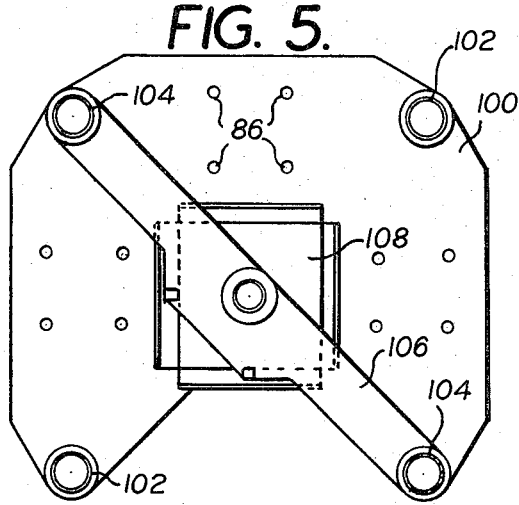
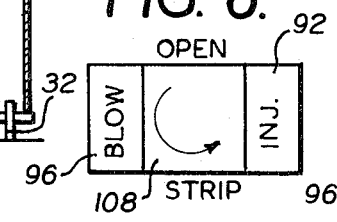
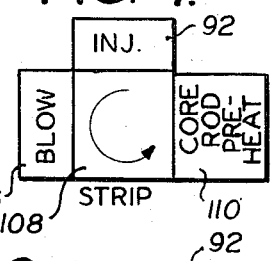
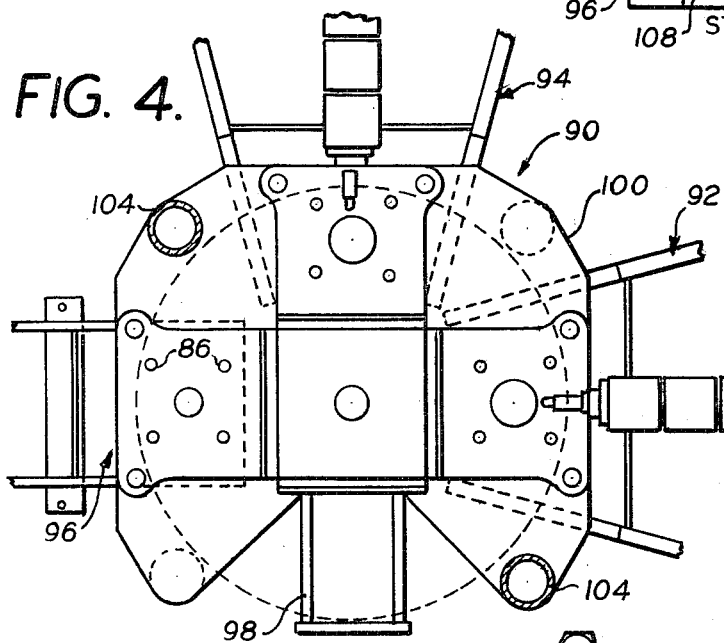
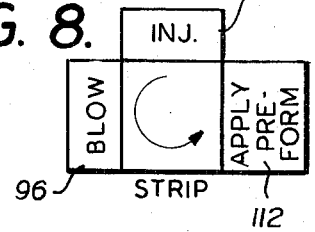
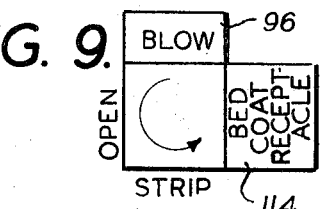
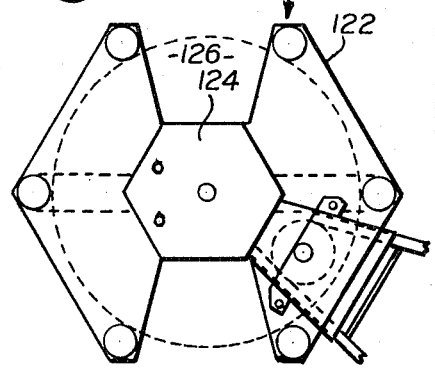
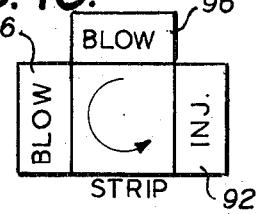

3,832,101

MOLDULAR CONSTRUCTION MULTI-STATION MOLDING APPARATUS

BACKGROUND AND SUMMARY OF THE INVENTION

One popular type of molding machine has a center indexing head from which core rods extend at 120 angular degrees spacing around the center of rotation of the head. An injection station, blowing station and stripper station are located at the same angular spacing for alignment with the core rods after each angular movement of the indexing head. The machines are of unitary construction and if the change in the operating procedure is desired, it may be difficult or impossible to achieve.

This invention makes the apparatus in sections or modular units; and the individual units are assembled, as required, to carry out any desired sequence of operations including additional operations which a unitary machine may not be designed to perform. Individual performance units can be of standardized design for production within a range of size and pressures. The use of standardized performance units obtain economies in the manufacture of molding apparatus, and can be used to cut delivery delays since it makes practical the stocking of important units that are used for most machines, and their assembly in different relation depending upon the desired process of manufacture. Some modifications of prior art constructions are made by this invention in order to obtain the necessary independence of units from one another.

Examples of some of the numerous possible processes for molding, that are made practical by this invention, will be explained in connection with the drawings.

Other objects, features, and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic side elevation of molding apparatus made in accordance with this invention, the view being taken along the line 1—1 of FIG. 2;

FIG. 2 is a sectional view taken along the line 2—2 of FIG. 1;

FIG. 3 is a sectional view taken on the line 3—3 of FIG. 2 and showing the supporting means of the center unit, but with all of the apparatus except the supporting means, connector plate and upper frame omitted for clearer illustration;

FIG. 4 is a diagrammatic view similar to FIG. 2 but showing a four station molding apparatus;

FIG. 5 is a diagrammatic view showing the connector frame of FIG. 4 and also the upper frame which is located above the level of the structure illustrated in FIG. 4;

FIGS. 6–10 are diagrammatic views showing some of the different processes that can be carried out by rearranging performance units around the center unit shown in FIGS. 4 and 5; and FIG. 11 is a diagrammatic view showing a connector plate for a six station machine.

DESCRIPTION OF PREFERRED EMBODIMENT

The apparatus shown in FIG. 1 includes a center unit 20, an injection unit 22 and a blowing unit 24. The center unit has a connector frame 26. This connector frame 26 is preferably supported from a floor 28, shown in FIG. 3.

Supporting means shown as tubular legs 30 extend from the supporting frame 26 to the floor 28 and levellers 32 are provided at the lower ends of each of the tubular legs 30. The center unit also has an upper frame 34; and some of the tubular legs 30 extend upward to the upper frame 34 to support this upper frame.

The center unit 20 has an indexing head 40 from which core rods 42 project in conventional manner. The indexing head 40 is carried by a center vertical shaft 44 which is slidable up and down in a bearing 46 carried by the upper frame 34. The lower end of the shaft 44 extends into a sleeve 47 which provides a bearing for the lower end of the shaft 44.

The shaft 44 rotates in a bearing 48 carried by the connector frame 26; and the lower end of the shaft 44 extends into a mechanism 50 which rotates the shaft 44 and the connected indexing head 40 in timed relation with the operating controls of the apparatus. Mechanism for periodically rotating indexing heads through a given angular movement and for raising and lowering the indexing head so that the core rods clear the molds of the apparatus are well-known and no further description of the apparatus for operating the indexing head is necessary for a complete understanding of this invention.

The shaft 44 has a circumferential groove 51 into which studs 52 extend. These studs 52 are fixed to levers 56 which extend on both sides of the vertical shaft 44. The levers 56 are supported by a fulcrum 58 which is ordinarily fixed but can be raised and lowered by a hydraulic cylinder 60 when desired. A ram 62 operated by a hydraulic cylinder in the upper part of the frame of the unit 22 raises and lowers a platen 64 to open and close a mold attached to the underside of the platen 64. The levers 56 are connected by pins 66 to the ram 62 at a point spaced from the studs 52 equal to the spacing of the studs from the fulcrum 58. Thus vertical movement of the pin 66 causes the studs 52 to move through half the distance moved by the ram 62 and this lifts the indexing head 40 for a distance equal to half the movement of the upper movable part of the mold of the unit 22. This way of raising and lowering the head 40 is also conventional except for the fact that the cylinder 60 is ordinarily connected with a part of the main frame of the molding apparatus whereas this invention provides the upper frame 34 of the center unit for connection with the cylinder 60.

The lever 56 for raising and lowering the indexing head can be operated by some other performance unit that has a ram. If necessary, the shaft 44 can be rotated and the cylinder 60 hung from a different part of the upper frame if the only ram equipped unit is located on another side of the center unit 20.

A mold 68 has an upper part 68a and a lower part 68b. The upper part 68a is secured to the platen 64. The lower part 68b is connected to another platen 70 secured to the connector frame 26.

In the construction shown in FIG. 1, the mold 68 is an injection mold and there is an injection nozzle 72 carried by injector feed mechanism 74 which comprises part of the unit 22. Thus unit 22 is an injection unit for supplying material to an injection mold in which core rods are coated with plastic material.

The performance unit 24, as shown in FIG. 1, is a blowing unit. It has a ram 78 which is moved up and down by a hydraulic cylinder located in the upper part of the unit 24. This ram 78 is connected to a platen 80 to which an upper part 82a of a mold 82 is connected. The mold 82 has a lower part 82b which is secured to a fixed platen 84 attached to the connector frame 26. The molds 68 and 82 are opened and closed in accordance with conventional procedure in timed relation with angular movements of the indexing head 40.

The performance units 22 and 24 are secured to the connector plate by detachable fastening means 86 shown diagrammatically in FIGS. 1 and 2.

FIG. 4 shows a center unit 90 which will accommodate four performance units. These performance units in FIG. 4 include an injection unit 92, a second injection unit 94 at an angular spacing of 90° from the injection unit 92, a blowing unit 96 and a stripper unit 98 for removing articles from core rods in accordance with conventional practice.

All of the performance units 92, 94, 96 and 98 can be of the same modular construction as units that are used with the combination shown in FIG. 2, except that FIG. 4 will accommodate one extra performance unit and in order to do this it is merely necessary to have a different center unit 90 with a connector frame 100 constructed for connection with four performance units. The center unit 90 can be otherwise the same as the center unit 20 of FIGS. 1 and 2 except for the connector frame 100, and the 90° indexing head.

FIG. 5 shows the connector frame 100 and shows supporting means 102 and 104. An upper frame 106 is connected to the upper parts of the supporting means 104 which extend up from the connector frame 100 far enough to support the upper frame 106. One other difference in FIGS. 4 and 5, as compared to FIGS. 1 and 2, is that an indexing head 108 is made with four sides for holding core rods, instead of three sides; but the indexing head can be raised and lowered and rotated by the same kind of mechanism as in FIG. 4 but indexed for 90° angular movements instead of 120° angular movements as is necessary with three sided indexing heads.

FIGS. 6–10 illustrate diagrammatically the different kinds of operations that can be performed with the apparatus shown in FIGS. 4 and 5 by merely changing the number of performance units and their relation to one another.

FIG. 6 shows the indexing head 108 with an injection unit 92 at one side and with the next station open; that is with no performance unit at the next station. This open station permits adjusting parison temperature on the core rods before they are inserted into the mold at a blowing unit 96. Also while in this position labelling or applying decorative effect can be accomplished just prior to blowing. At the fourth station the blow units are stripped from the core rods.

FIG. 7 shows a construction in which the first station is provided with a core rod temperature conditioner 110. At the next station the conditioned core rods are inserted into the molds of an injector unit 92 and the core rods with the parisons from the injector 92 are blown in a blowing unit 96 after which the blown articles are stripped from the core rods.

FIG. 8 shows an applicator 112 at the first station for applying pre-molded liners to the core rods. The core rods with the pre-molds applied to them are supplied to the injector unit 92 where parisons are applied over the pre-molds and the pre-molds are strongly heated by contact with the material in the injection unit 92. The core rods then pass to the blowing unit 96 where the material on the core rods is blown to form a laminated article which is stripped from the core rods at the next station.

FIG. 9 shows molding apparatus where no injection unit is used. The core rods are coated with material by passing through a bed coat receptacle 114 at the first station. The material with which the core rods are coated is blown in a blowing unit 96. In the construction shown in FIG. 9 the third station is open and the blown articles will remain stationary at this open station long enough to cool substantially more than is possible where the blowing unit is the next unit ahead of the stripping station. After cooling while other core rods are blown and still others immersed in the bed coat receptacle, the articles at the third station are carried to the stripping station with the next 90° movement of the indexing head.

FIG. 10 shows an injector unit 92 at the first station and a first blowing unit 96 at the second station. This blowing unit 96 may be used to partially blow the parisons while they cool to a predetermined temperature which is just above the ideal temperature for biaxial orientation. As the partially blown parisons travel to and are inserted in a second blowing unit 116, they are cooled to the ideal temperature for the final blow and on the next movement of the indexing head they are carried to the stripper station.

FIG. 11 shows another modification of this invention in which a center unit 120 has a connector frame 122 which will accommodate six performance units. The indexing head 124 is provided with fixed sides so that core rods can be presented to all six stations simultaneously. The connector frame 122 can be connected with performance units in the same way as in FIGS. 2 and 4; and the connector frame 122 is provided with spaces 126 to accommodate stripper mechanism. With this center unit 120, a manufacturer can have one injector unit, one blowing unit, and one stripper unit, and this will provide the production of a three station machine as shown in FIG. 2.

There are other possibilities with the connector unit of FIG. 11, such as providing of pre-heating of the core rods and application of pre-forms and extra cooling time; but one of the principal advantages of FIG. 11 is that the production of the machine can be doubled by adding a second injector unit, a second blowing unit and a second stripper unit. Thus the manufacturer can increase the output of his machine by buying additional units and it is not necessary to buy an entirely new machine of six stations, nor is it necessary to buy a second machine if it is to be used in conjunction with the first machine.

It will be evident that the concept of a modular molding apparatus provides many different choices of manufacturing procedure, only a few of which are suggested by FIGS. 6–10; and that much more flexible production can be obtained from the same apparatus and at greatly reduced cost Where production procedures at a plant are changed, because of new products to be made or different kinds of material to be used, this invention permits the equipment to be adapted to the new processes; whereas with molding machines of the prior art it would often be necessary to buy a completely new molding machine and to put the original machine out of service.

The preferred embodiment and some modifications of the invention have been illustrated and described, but changes and other modifications can be made and features of the invention can be used in different combinations without departing from the invention as defined in the claims.

What is claimed is:

1. A modular molding machine comprising a center unit including an indexing head by which core rods are carried, the head having faces angularly located around an axis of rotation of the head and from which core rods project, mechanism for intermittently turning the head angularly about said axis to bring core rods of the different faces successively to predetermined station positions, a plurality of modular performance units that cooperate with the core rods for making a molded article, means for selectively connecting different performance units with the center unit at different stations depending upon a desired sequence of operations in the molding of the article.

2. The modular molding machine described in claim 1 characterized by the performance units being interchangeable between different stations and being connected with the center unit by detachable fastening means.

3. The modular molding machine described in claim 1 characterized by some of the performance units including C-clamp structure with a platen at a lower part of the C-clamp structure for holding one-half of a mold, a clamping element at the upper part of the C-clamp structure for connection with an upper part of a mold and for opening and closing the mold.

4. The modular molding machine described in claim 1 characterized by the center unit including a connector frame that extends outward from different sides thereof with parts of the connector frame that extend over parts of performance units that are brought into position for joining to the connector frame at any of a plurality of stations at which the indexing head stops after any of its successive angular movements.

5. The modular molding machine described in claim 4 characterized by the connector frame having a recess at one station where the frame extends in close to a face of the indexing head, and a stripper performance unit that fits into said recess in position to eject molded articles from the core rods each time the indexing head brings successive faces into register with said recess.

6. The modular molding machine described in claim 1 characterized by the machine including a core rod treating station, one of the performance units including an injection mold in which plastic is injected under pressure to coat the core rods, the injection mold unit being selectively movable to locate it ahead of or behind the core rod treating station with respect to the direction in which the indexing head moves during the sequence of steps in the making of a molded article.

7. The modular molding machine described in claim 1 characterized by mechanism on the center unit for raising and lowering the indexing head and the core rods in timed relation with the opening and closing of a mold into which the core rods are inserted, and means for connecting said mechanism with a part of the performance unit that includes the mold that closes over the core rods and that opens for movement of the core rods from the mold.

8. The modular molding machine described in claim 1 characterized by a performance station at which core rods are pre-heated before being moved into a performance unit that includes an injection mold, and other performance units beyond the injection mold, some of the performance units being detachably connected with the center unit for movement at the different positions to change the sequence of operation of the machine.

9. The modular molding machine described in claim 1 characterized by a performance unit at which the core rods receive a preform jacket thereover, an injection station at which core rods with the preform jacket have a molten layer of plastic applied over the preform jacket, another performance unit including a blowing mold beyond the injection station, and a performance unit including a stripper for ejecting molded articles from the core rods, some of the performance units being detachably connected with the center unit for movement into different positions to change the sequence of operation of the machine.

10. The modular molding machine described in claim 1 characterized by one of the performance units including a bed coating means having an open receptacle containing fluidized material into which the core rods dip for coating as they pass the station having the bed coating means, another of the performance units being a blowing unit, said performance units being movable to different stations to change the distance between said performance units and the resulting length of time that the core rods are out of the coating receptacle before reaching the blowing station.

11. The modular molding machine described in claim 1 characterized by different performance units at successive stations each with a blowing mold and in which a parison on a core rod is given a preliminary blow to a desired temperature and then a subsequent additional blowing at the second blowing station, some of the performance units of the machine being detachably connected with the center unit for movement into different positions to change the sequence of operation of the machine.

12. The modular molding machine described in claim 1 characterized by the indexing head having more faces and stopping at more stations than there are performance units around said center unit, the performance units being movable to different stations to change the relative positions of the idle stations with respect to the performance units and thereby change the length of time required for core rods to travel between selected performance stations.

13. The modular molding machine described in claim 1 characterized by three performance units for coating a core rod, blowing the coating and stripping the blown articles from the core rods, the center unit to which said performance units are connected having an indexing head with six faces, and the center unit having means for connecting three more performance units thereto to double the productive capacity of the machine.

14. The modular molding apparatus described in claim 1 characterized by the center unit having supporting means extending downward from the connector frame to a supporting floor, an upper frame of the center unit located above the connector frame and above the indexing head, some of the supporting means extending upward to said upper frame as supports therefor, the indexing head being supported by said upper frame.

15. The modular molding apparatus described in claim 14 characterized by the performance units having C-clamp frames that extend under the connector frame and over the upper frame at locations between the supporting means that extend downward to a supporting floor.

* * * * *